US006027382A

United States Patent [19]
Reindl et al.

[11] Patent Number: 6,027,382
[45] Date of Patent: Feb. 22, 2000

[54] FASTENING ARRANGEMENT

[75] Inventors: Johann Reindl, Bierbertal; Joachim Schneider, Ehringshausen-Katzenfurt, both of Germany

[73] Assignee: Emhart Inc., Newark, Del.

[21] Appl. No.: 09/068,920

[22] PCT Filed: Sep. 4, 1997

[86] PCT No.: PCT/IB97/01057

§ 371 Date: May 20, 1998

§ 102(e) Date: May 20, 1998

[87] PCT Pub. No.: WO98/13900

PCT Pub. Date: Apr. 2, 1998

[30] Foreign Application Priority Data

Sep. 24, 1996 [DE] Germany ............... 296 16 631 U

[51] Int. Cl.[7] .................................................. G01R 11/03
[52] U.S. Cl. ........................................ 439/793; 439/801
[58] Field of Search ................................ 439/792, 801, 439/809, 813, 888.3

[56] References Cited

U.S. PATENT DOCUMENTS 5,292,264  3/1994  Blank ........................................ 439/813

Primary Examiner—Steven L. Stephan
Assistant Examiner—J. F. Duverne
Attorney, Agent, or Firm—Edward D. Murphy

[57] ABSTRACT

A fastening arrangement comprises a screw (14) to be used as a weld screw for the arrangement of at least one cable terminal (20) with a cable holder (21). The screw (14) has a base portion (15) which is polygonal in cross section with an outer rim (16), and with a plastic part (1) which cooperates with the screw (14) and of which the lower portion (2) has an aperture (3) with an inner rim (4) adapted to the outer rim (16) of the base portion (15) and of which the upper portion (5) has recesses (6a, 6b, 6c, 6d, 6e, 6f) limited by pegs (7a, 7b; 7b, 7c; 7c, 7d; 7d, 7e; 7e, 7f; 7f, 7a) with an orifice (8) for receiving the cable holder (21). At least one peg (7a, 7b, 7c, 7d, 7e, 7f) two adjacent pegs (7a, 7b; 7b, 7c; 7c, 7d; 7d, 7e; 7e, 7f; 7f, 7a) has at least one web (9a, 9b, 9c, 9d, 9e, 9f) which extends to the adjacent peg (7a, 7b, 7c, 7d, 7e, 7f) and partially limits the orifice (8).

8 Claims, 3 Drawing Sheets

FASTENING ARRANGEMENT

The present invention relates to a fastening arrangement with a screw to be used as a weld screw for the arrangement of at least one cable terminal with a cable holder.

Known screws to be used as a weld screw for the arrangement of at least one cable terminal with a cable holder have a shank and an adjoining flange which has a welding surface on its side remote from the shank which is used to weld the weld screw to a metallic structure which can be, for example, a motor vehicle body. Such screws are used, for example, as an earth connection for electrical leads. If an electrical lead is to be fastened on such a weld screw, the shank preferably has an external thread, the leads are provided with a cable terminal via a cable holder, and the cable terminal is fastened on the shank by means of a nut. If an electrical lead is fastened on a screw as earth connection, relatively high turning moments are required to fix the electrical lead to ensure that sufficiently good electrical contact exists between the screw and the electrical lead.

A problem which repeatedly leads to difficulties when fastening components on weld screws lies in the fact that the components are not generally sufficiently protected from twisting. Forces and turning moments of greatly differing natures and values act on the components held by the weld screws owing to vibrations occurring during the movement of the motor vehicle. It is known from German Utility Model No G 84 25 599.4 that such turning moments cause the component to twist with respect to the weld screw. The component is consequently loosened, particularly if the shank has spiral projections, i.e. a thread, so components can no longer fulfil their function to the optimum level.

It is proposed in EP 0 533 421 A2 that a locking screw which cooperates with a plastics part is used as a locking weld screw. The weld screw has a base part with a non-circular outer rim penetrating into the plastics part of which the lower portion has an inner rim. An upper portion of the plastics part has recesses for receiving a cable holder. The non-circular design of the outer rim of the base part of the locking screw and the corresponding non-circular design of the lower portion of the plastics part allow a secure non-rotatable joint between the weld screw and the plastics part. The cable holder of the cable terminal to which a cable is fastened is guided through the recess so the cable terminal is fixed in a rigid position and cannot twist itself during assembly. The cable terminal is fixed by a nut screwed onto a threaded shank of the locking weld screw. The screwing-on process takes place automatically, the tightening moment being relatively high to ensure that sufficiently good electrical contact exists between the cable terminal and the locking screw. Owing to the high tightening moment, the plastics part can be set into rotation by a nut with an exact cable terminal. This can occur because the plastics part cannot absorb the tightening moment or the moment originating from the cable terminal. The cable terminal therefore adopts a position different from that actually intended. In particular in motor vehicle construction, in which the above-described fastening arrangements are used as earth connections, such positional displacement of the cable terminal can lead to short-circuits as the cable terminal can be joined to adjacent electrical devices.

For fixing a cable holder on the weld screw, the cable holder which has a substantially disk-shaped terminal is slipped over the shank of the weld screw and fastened by a nut screwed onto the threaded shank of the weld screw. During installation it can happen that, owing to the resilient properties of a cable joined to the cable terminal, the cable terminal is released from the weld screw necessitating re-application of the cable terminal to the weld screw. This effect is further increased if several cable terminals are to be fixed on one weld screw. If so-called overhead installation is to take place, this leads to quite complex handling.

It is an object of the present invention to develop the known fastening arrangement with a screw to be used as a weld screw for the arrangement of at least one cable terminal with a cable holder such that fixing of a cable terminal to the weld screw is simplified and overhead installation is preferably to be simplified. A further object of the invention is to provide a fastening arrangement by means of which twisting of the plastics part with the cable terminal is prevented during installation.

The present invention provides a fastening arrangement with a screw to be used as a weld screw for the arrangement of at least one cable terminal with a cable holder, wherein the screw has a base portion which is polygonal in cross section with an outer rim, and with a plastics part which cooperates with the screw and of which the lower portion has an aperture with an inner rim adapted to the outer rim of the base portion and of which the upper portion has recesses limited by pegs with an orifice for receiving the cable holder, characterised in that at least one peg of two adjacent pegs has at least one web which extends to the adjacent peg and partially limits the orifice. This design of the plastics part ensures that a cable terminal with a cable holder is not released from the weld screw once the weld screw has been introduced into the recess. This is achieved in that the web forms a type of stop against which the cable terminal strikes if it is to move out of the recess. A design of the plastics part of the fastening arrangement according to the invention in which each respective peg has a web extending to each adjacent peg is preferred.

According to a further advantageous design of the fastening arrangement, it is proposed that a gap be provided between a web and a peg or between two webs of adjacent pegs. This gap forms an inlet orifice through which a cable holder can be introduced into the recess. The width of the gap is preferably smaller than the width of the cable holder. To simplify introduction of a cable holder it is proposed that each web have, at its free end portion, an inlet bevel along which the cable holder slides when it is pressed into the recess.

To simplify the introduction of a cable holder into the recess and to reduce the introduction forces, it is proposed that each web and/or each peg be resilient in design. This can be achieved by suitable choice of material for the plastics part.

Under certain circumstances, the plastics part has to be removed from the weld screw. This can be the case, for example, if the plastics part is damaged. To simplify removal of the plastics part from the weld screw it is proposed that at least two webs, preferably two diametrically opposed webs, form an outer collar portion. The outer collar portions act as working surfaces for a removal tool.

A design of the fastening arrangement in which the web or the webs is or are an integral constituent of the peg is preferred. The web or the webs and the peg or the pegs form a single-part component.

According to a further advantageous idea, a fastening arrangement which is particularly suitable for overhead installation is proposed. A fastening arrangement of this type is distinguished in that the plastics part has at least one catch projection which extends from the inner rim into the aperture and engages beneath the base portion. This measure ensures that the plastics part cannot unintentionally be removed from the weld screw.

According to a further advantageous development of the fastening arrangement, a plastics part is proposed in which several catch projections are formed equidistantly from one another. The catch projection or the catch projections is or are preferably an integral constituent of the plastics part.

According to a further idea of the invention, a fastening arrangement with a screw to be used as a weld screw for the arrangement of at least one cable terminal with a cable holder, which ensures that the plastics part is not twisted during installation. For this purpose, it is proposed that the lateral faces of the outer rim be curved, preferably concavely curved. This design of the lateral faces of the outer rim and therefore also the corresponding lateral faces of the inner rim which are curved in the opposite direction is achieved such that the turning moment is safely and reliably absorbed by the plastics part during the fastening process without the plastics part changing its position when a cable terminal is screwed on. According to a further idea, it is proposed that the base portion have at least an octagonal cross section. The contact area between the base portion of the weld screw and the aperture of the plastics part is increased by this design of the base portion. A design in which the cross section of the base portion has the form of a regular polygon is preferred. The greater the number of corners of a polygon of the cross section of the base part, the more accurate the positioning of a cable terminal for installation.

An embodiment of a fastening arrangement will now be described with reference to the accompanying drawings, in which.

Figure 1:
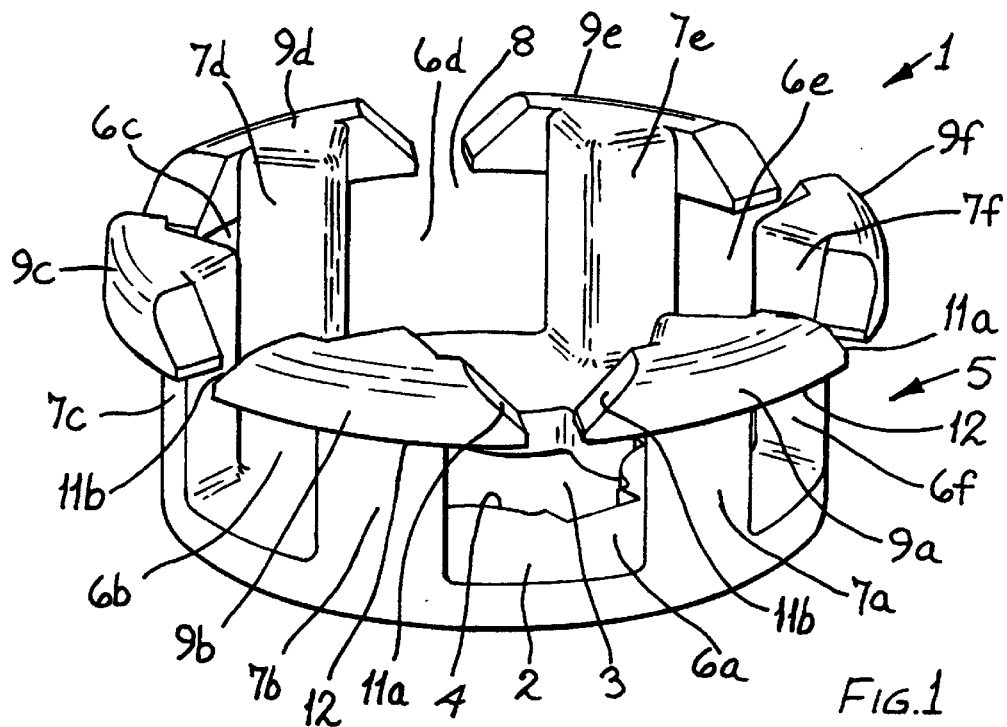
FIG. 1 is a perspective view of a plastics part.
Figure 2:
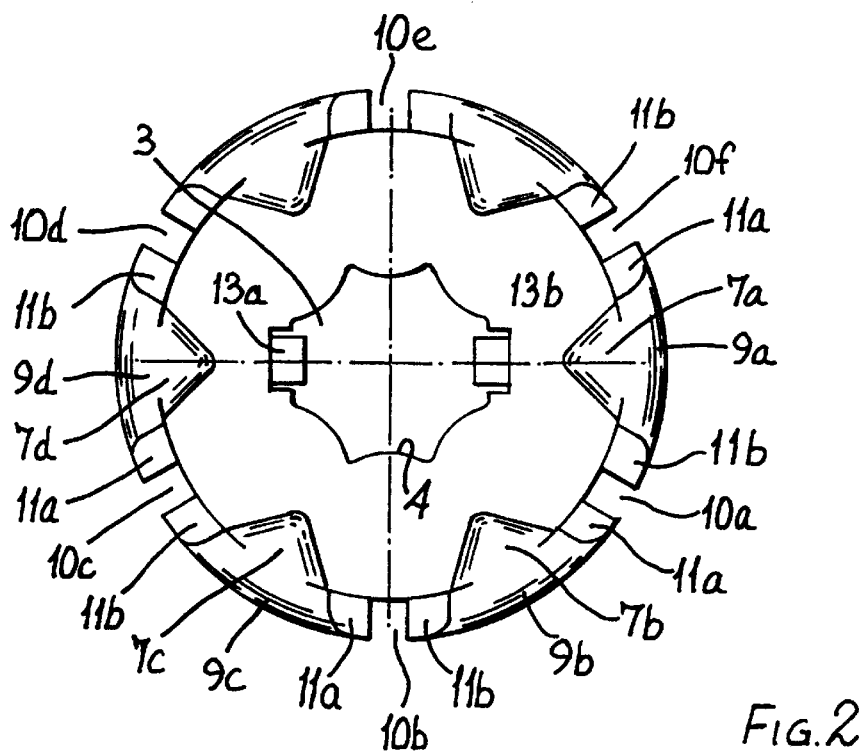
FIG. 2 is a plan view of the plastics part.
Figure 3:
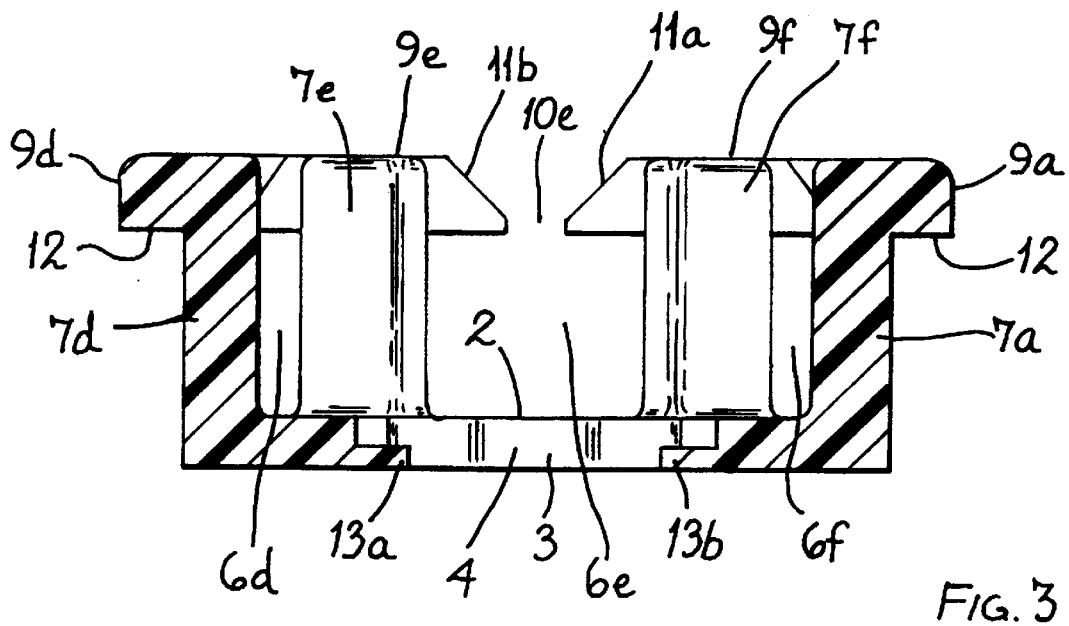
FIG. 3 is a front view of the plastics part according to FIG. 1 in a solid section.

FIG. 1 is a perspective view of a plastics part 1. The plastics part 1 is substantially cylindrical in design. It has a lower portion 2 in which an aperture 3 is formed. The aperture 3 has an inner rim 4 which is adapted to an outer rim of a weld screw. The upper portion 5 of the plastics part 1 has recesses 6a to 6f. Each recess 6a to 6f has an orifice 8 for receiving a cable holder. The respective recesses 6a, 6b to 6f are limited by adjacent pegs 7a, 7b; 7b, 7c; 7c, 7d; 7d, 7e; 7e, 7f; 7f, 7a. The pegs 7a to 7f extend substantially perpendicularly from the lower portion 2 of the plastics part 1. Each peg 7a, 7b, 7c, 7d, 7d, 7f has a web 9a, 9b, 9c, 9d, 9e, 9f. Each web 9a to 9f extends to the adjacent peg. If the peg 7a is considered, for example, the web 9a extends both to the peg 7b and to the peg 7f. Similarly observed, the webs 9b to 9f are formed on the pegs 7b to 7f.

A respective gap 10a, 10b, 10c, 10d, 10e, 10f is formed between the webs 9a, 9b; 9b, 9c; 9c, 9d; 9d, 9e; 9e, 9f; 9f, 9a. The width of the respective gap 10a to 10f is smaller than the width of a cable holder.

As can be seen in particular in FIG. 1, each web 9a, 9b, 9c, 9d, 9e and 9f has a respective inlet bevel 11a or 11b at its two free end portions. Each web 9a to 9f and each peg 7a to 7f is preferably formed from a resilient plastics material. The webs 9a to 9f are formed on the pegs 7a to 7f such that they each form an outer collar portion. The respective face 12 of each web 9a to 9f adjacent to the respective web 7a to 7f acts as a contact face for a tool which is not shown, for removing the plastics part 1 from a screw.

The plastics part 1 has two catch projections 13a, 13b protruding into the aperture 3. The catch projections 13a, 13b are diametrically opposed. They form an integral constituent of the plastics part 1.

Figure 4:
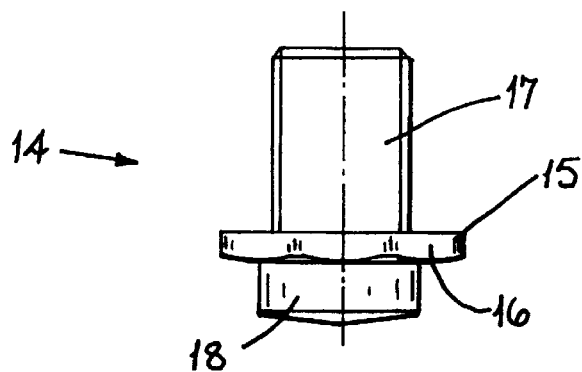
FIG. 4 is a front view of a weld screw.
Figure 5:
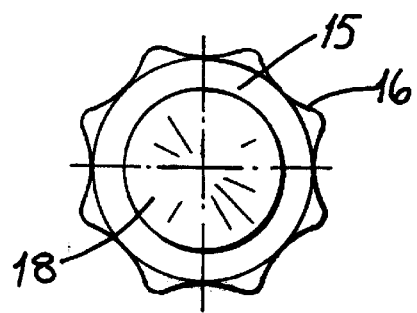
FIG. 5 is a view of the weld screw according to FIG. 4 from below.

FIGS. 4 and 5 show a screw 14 to be used as a weld screw for the arrangement of at least one cable terminal with a cable holder. The screw 14 has a base portion 15 which is polygonal in cross section with an outer rim 16. The base portion 15 is octagonal in design. The lateral faces of the outer rim 16 are concavely curved. The lateral faces of the inner rim 14 are correspondingly convexly curved. The base portion 15 is adjoined by a threaded portion 17 onto which a nut can be screwed. A stud-shaped portion 18 which is used to form a welded attachment to a metallic structure is formed beneath the base portion 15.

Figure 6:
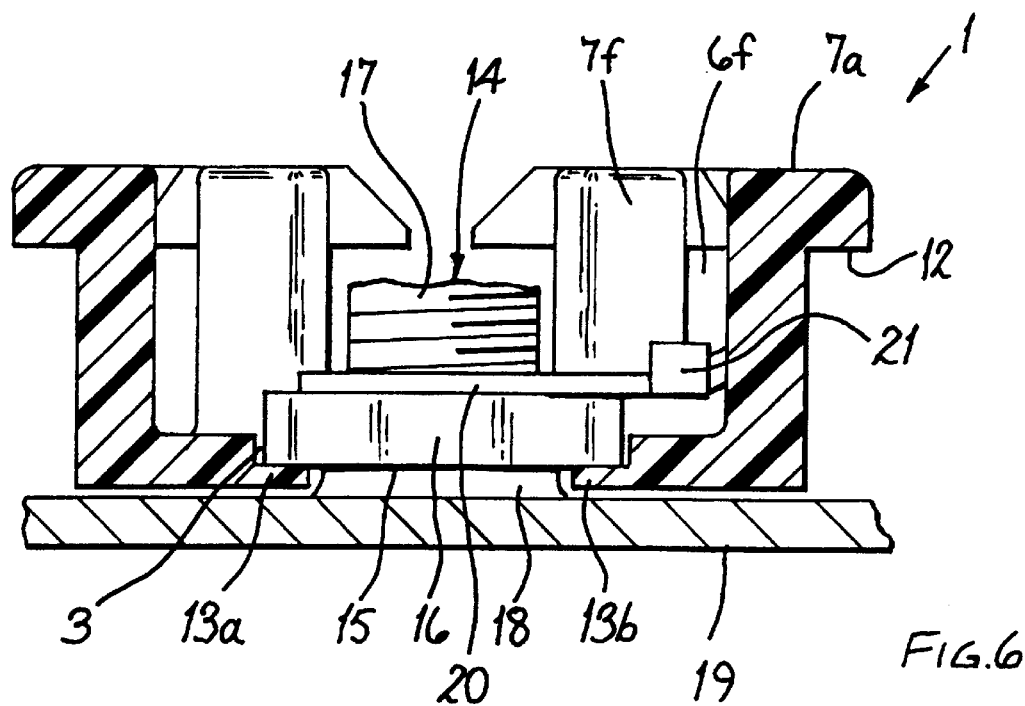
FIG. 6 is a schematic view of a fastening arrangement.

Reference will now be made to FIG. 6 which shows a fastening arrangement. The fastening arrangement comprises a screw 14 which is welded to a structure 19. The screw 14 is welded to the structure 19 via the stud-shaped portion 18. The joint is designed such that the base portion 15 is spaced from the structure 19. The interval between the base portion 15 and the structure 19 is sufficiently great for the catch projections 13a, 13b to be introduced between the base portion 15 and the structure 19. The plastics part 1 is held on the screw 14 by the catch projections 13a, 13b. The polygonal base portion 15 with the outer rim 16 projects partially into the aperture 3 in the plastics part. A substantially annular cable terminal 20 rests on the base portion 15. The cable terminal 20 has a through-bore through which the threaded shank 17 of the screw 14 extends. The cable terminal 20 has a cable holder 21 which extends through the recess 6f. A cable, not shown, is non-positively joined to the cable terminal 20 by the cable holder 21. The width of the cable holder 21 is calculated such that it substantially corresponds to the interval between the adjacent posts 7f, 7a. In the embodiment illustrated, the interval between two adjacent posts 7a, 7b; 7b, 7c; 7c, 7d; 7d, 7e; 7e, 7f; 7f, 7a is invariably equal but this is not essential. Cable terminals with cable holders of different widths can be used if different intervals are adopted.

Figure 7:
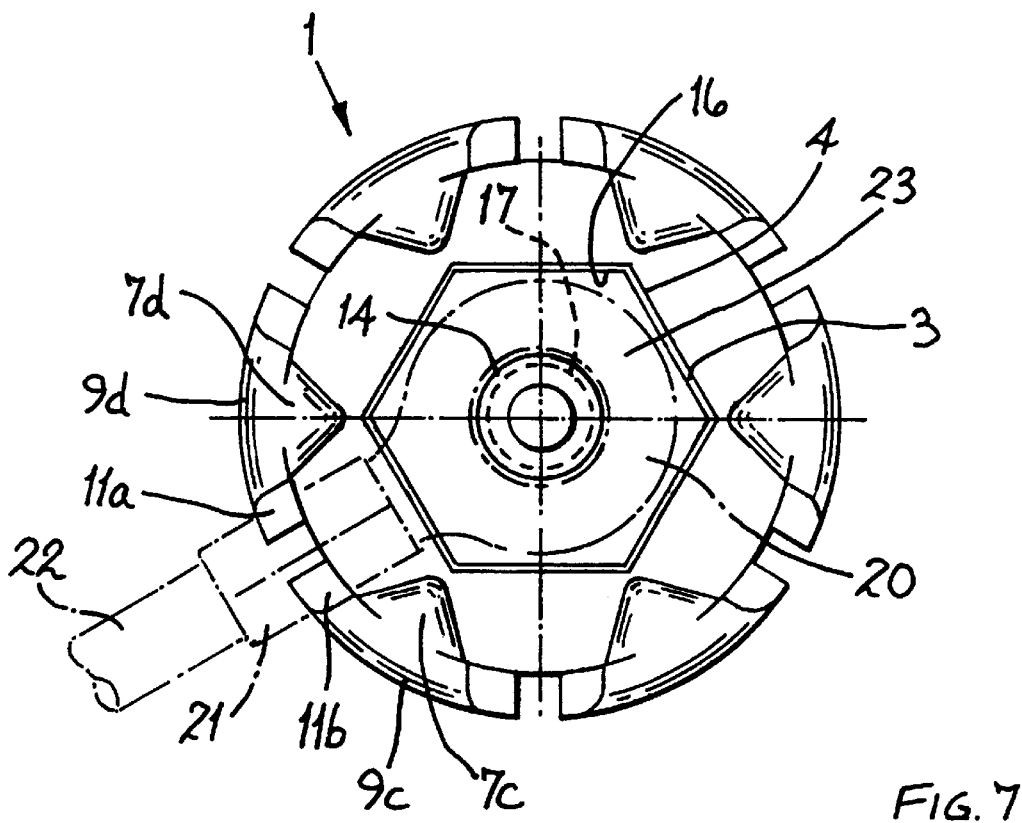
FIG. 7 is a schematic plan view of a fastening arrangement.

FIG. 7 is a plan view of a fastening arrangement. The fastening arrangement has a plastics part 1 which substantially corresponds in design to the plastics part 1 as shown in FIG. 1. An aperture 3 having a hexagonal cross section is formed in the plastics part 3. A base portion 15 of a screw 14 having a hexagonal cross section extends into the aperture 3. A cable terminal 20 with a cable holder 21 and an electric cable 22 is shown in broken lines. The cable holder 21 is fixed in the recess 6b limited by the posts 7c, 7d and the webs 9c, 9d. A nut 23 is screwed onto the threaded portion 17 above the cable holder 21.

We claim:

1. A ground connection for connecting at least one terminal cable member to an automobile body part, the combination comprising a threaded stud member welded to said body part and having a polygonal shaped base portion, a plastic part having a base and a central aperture therein surrounding and complementing in shape said polygonal base portion of said threaded stud member, and said base of said plastic part further having a peripheral array of upstanding peg members spaced from said threaded stud member for allowing a nut and said at least one cable terminal member to be mounted on said threaded stud member, an orifice defined by adjacent ones of said upstanding peg members for receiving a cable holder of said at least one terminal cable member, and at least one of said upstanding peg members having a member extending towards an adjacent peg member for partially limiting the entrance into said orifice, whereby said web member prevents the exit of said cable holder from said orifice due to gravitational and other incidental forces.

2. A ground connection according to claim 1, wherein each of said peg members has said at least one web member extending towards each adjacent peg member to thereby define a gap between said each web member which is smaller than the width of said cable holder.

3. A ground connection according to claim 2, wherein each said web member is beveled at its free end.

4. A ground connection according to claim 3, wherein each said web member is resilient.

5. A ground connection according to claim 1, wherein at least two of said web members form a collar portion on said plastic part which acts as a grip for removing said plastic part from said threaded stud member.

6. A ground connection according to claim 1, wherein said plastic part has at least one catch projection extending from the rim of said central aperture and beneath said base portion of said threaded stud member.

7. A ground connection according to claim 6, wherein a plurality of catch projections are provided and are formed equidistant from one another.

8. A ground connection according to claim 1, wherein the lateral faces of said polygonal shaped base portion of said threaded stud member are concavely curved.

* * * * *